US011766722B2

(12) United States Patent
Kottilingam et al.

(10) Patent No.: US 11,766,722 B2
(45) Date of Patent: Sep. 26, 2023

(54) METHOD FOR THE HYBRID CONSTRUCTION OF MULTI-PIECE PARTS

(71) Applicant: General Electric Company, Schenectady, NY (US)

(72) Inventors: Srikanth Chandrudu Kottilingam, Simpsonville, SC (US); David Edward Schick, Simpsonville, SC (US); Jon Conrad Schaeffer, Greenville, SC (US); Steven J. Barnell, Pelzer, SC (US); Brian Lee Tollison, Honea Path, SC (US); Yan Cui, Greer, SC (US)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 17/061,553

(22) Filed: Oct. 1, 2020

(65) Prior Publication Data
US 2021/0017868 A1 Jan. 21, 2021

Related U.S. Application Data

(63) Continuation of application No. 15/412,945, filed on Jan. 23, 2017, now Pat. No. 10,830,071.

(51) Int. Cl.
*B23P 15/04* (2006.01)
*B23P 19/10* (2006.01)
(Continued)

(52) U.S. Cl.
CPC ............. *B22F 10/10* (2021.01); *B22F 3/24* (2013.01); *B22F 5/009* (2013.01); *B22F 10/00* (2021.01);
(Continued)

(58) Field of Classification Search
CPC .......... F01D 9/041; F01D 5/005; F01D 9/042; B22F 3/24; B22F 5/009; B22F 10/00;
(Continued)

(56) References Cited

U.S. PATENT DOCUMENTS

| 4,987,736 A | 1/1991 | Ciokajlo et al. |
| 6,000,906 A | 12/1999 | Draskovich |

(Continued)

FOREIGN PATENT DOCUMENTS

| EP | 2 942 424 A2 | 11/2015 |
| EP | 2 977 559 A1 | 1/2016 |

(Continued)

OTHER PUBLICATIONS

Japanese Office Action for JP Application No. 2018-002287 dated Oct. 5, 2021; 11 pgs.

(Continued)

*Primary Examiner* — Rick K Chang
(74) *Attorney, Agent, or Firm* — Fletcher Yoder, P.C.

(57) ABSTRACT

A multi-piece part includes multiple pieces fabricated via different types of fabrication processes, wherein the multiple parts are configured to be coupled to one another to form the assembly. At least one of the multiple parts is fabricated via an additive manufacturing method. The multi-piece part also includes a holder assembly that couples and holds together the multiple pieces of the multi-piece part, wherein the holder assembly comprises a reversible, mechanical-type coupling.

20 Claims, 5 Drawing Sheets

(51) Int. Cl.
| | |
|---|---|
| *B22F 10/10* | (2021.01) |
| *B33Y 80/00* | (2015.01) |
| *B33Y 99/00* | (2015.01) |
| *B23P 6/00* | (2006.01) |
| *B22F 3/24* | (2006.01) |
| *F01D 5/00* | (2006.01) |
| *F01D 9/04* | (2006.01) |
| *B33Y 10/00* | (2015.01) |
| *B22F 5/00* | (2006.01) |
| *B22F 10/00* | (2021.01) |
| *B22F 10/20* | (2021.01) |
| *B22F 10/62* | (2021.01) |
| *B22F 10/64* | (2021.01) |
| *B22F 10/66* | (2021.01) |

(52) U.S. Cl.
CPC .............. *B22F 10/20* (2021.01); *B23P 6/005* (2013.01); *B23P 15/04* (2013.01); *B23P 19/10* (2013.01); *B33Y 10/00* (2014.12); *B33Y 80/00* (2014.12); *B33Y 99/00* (2014.12); *F01D 5/005* (2013.01); *F01D 9/041* (2013.01); *F01D 9/042* (2013.01); *B22F 10/62* (2021.01); *B22F 10/64* (2021.01); *B22F 10/66* (2021.01); *B22F 2003/242* (2013.01); *B22F 2003/247* (2013.01); *B22F 2003/248* (2013.01); *B22F 2207/20* (2013.01); *B22F 2998/00* (2013.01); *F05D 2230/20* (2013.01); *F05D 2230/21* (2013.01); *F05D 2230/22* (2013.01); *F05D 2230/23* (2013.01); *F05D 2230/31* (2013.01); *F05D 2230/51* (2013.01); *F05D 2230/60* (2013.01); *F05D 2230/64* (2013.01); *F05D 2230/70* (2013.01); *F05D 2230/80* (2013.01); *Y02P 10/25* (2015.11); *Y02T 50/60* (2013.01)

(58) Field of Classification Search
CPC ................ B22F 10/10; B22F 2003/242; B22F 2003/247; B22F 2003/248; B22F 2207/20; B22F 2998/00; B22F 10/20; B23P 6/005; B23P 15/04; B23P 19/10; B33Y 10/00; B33Y 80/00; B33Y 99/00; F05D 2230/20; F05D 2230/21; F05D 2230/22; F05D 2230/23; F05D 2230/31; F05D 2230/51; F05D 2230/60; F05D 2230/64; F05D 2230/70; F05D 2230/80; Y02P 10/25; Y02T 50/60
See application file for complete search history.

(56) References Cited

U.S. PATENT DOCUMENTS

| | | |
|---|---|---|
| 6,164,903 A | 12/2000 | Kouris |
| 7,326,030 B2 | 2/2008 | Albrecht et al. |
| 8,202,043 B2 | 6/2012 | McCaffrey |
| 9,482,249 B2 | 11/2016 | Kottilingam et al. |
| 2004/0120811 A1 | 6/2004 | Darkins, Jr. et al. |
| 2006/0228211 A1 | 10/2006 | Vance et al. |
| 2010/0080687 A1 | 4/2010 | Vance |
| 2013/0336794 A1 | 12/2013 | Armstrong et al. |
| 2014/0255194 A1 | 9/2014 | Jones |
| 2015/0068629 A1 | 3/2015 | Kottilingam et al. |
| 2015/0343674 A1 | 12/2015 | Lowth et al. |
| 2016/0025108 A1 | 1/2016 | Englebert |
| 2016/0090851 A1 | 3/2016 | Carr et al. |
| 2016/0123163 A1 | 5/2016 | Freeman et al. |
| 2018/0099329 A1* | 4/2018 | Korff ................. B22C 9/02 |

FOREIGN PATENT DOCUMENTS

| | | |
|---|---|---|
| EP | 3 075 963 A1 | 10/2016 |
| JP | S61-66802 A | 4/1986 |
| JP | 2007255224 A | 10/2007 |
| JP | 2015072007 A | 4/2015 |
| WO | 2015/058043 A1 | 4/2015 |

OTHER PUBLICATIONS

Extended European Search Report and Opinion issued in connection with corresponding EP Application No. 18151928.1 dated Jun. 28, 2018.

* cited by examiner

METHOD FOR THE HYBRID CONSTRUCTION OF MULTI-PIECE PARTS

CROSS-REFERENCE TO RELATED APPLICATIONS

This application is a continuation of U.S. patent application Ser. No. 15/412,945, entitled "SYSTEM AND METHOD FOR THE HYBRID CONSTRUCTION OF MULTI-PIECE PARTS," filed Jan. 23, 2017, which is herein incorporated by reference in its entirety for all purposes.

BACKGROUND

The subject matter disclosed herein relates generally to gas turbines, and, more particularly to fabrication of multi-piece parts (e.g., nozzles) for gas turbine systems.

A gas turbine system combusts a fuel to generate hot combustion gases, which flow through a turbine to drive a load and/or a compressor. In such systems, fabrication of parts (e.g., nozzle segments, blades, shrouds, etc.) may be complex at least due to different desired mechanical and physical properties and/or complex geometries and features of the parts. It may be challenging to construct parts to meet the design goals and targets on multiple fronts. For example, it may be desirable for parts that are subjected to the high temperatures in a hot gas path of a gas turbine system to have particular mechanical and/or thermal properties that are challenging to achieve with a single-material fabrication process. These parts may also include fine (e.g., small) cooling features that can be challenging or impossible to manufacture using typical manufacturing methods, such as casting. Further, even when certain relatively fine features can be constructed using typical manufacturing methods, such as casting, these processes typically suffer in terms of production time, high defects rates, and low yields.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a multi-piece part includes multiple pieces fabricated via different types of fabrication processes, wherein the multiple parts are configured to be coupled to one another to form the assembly. At least one of the multiple parts is fabricated via an additive manufacturing method. The multi-piece part also includes a holder assembly that couples and holds together the multiple pieces of the multi-piece part, wherein the holder assembly comprises a reversible, mechanical-type coupling.

In another embodiment, a multi-piece turbine part includes a first piece fabricated via an additive manufacturing process, and a second piece and a third piece fabricated via a casting process. The multi-piece turbine part includes alignment features on a first interface between the first segment and the second segment and on a second interface between the first segment and the third segment, wherein the first segment is coupled to the second segment at the first interface and the first segment is coupled to the third segment at the second interface. The multi-piece turbine part also includes a holder assembly that extends through and couples together the first piece, the second segment, and the third segment of the multi-piece turbine part.

In another embodiment, a method includes fabricating a plurality of pieces of a multi-piece part via a plurality of different types of fabrication processes. At least one of the plurality of pieces is fabricated via an additive manufacturing process. The method includes coupling the plurality of pieces together to assemble the multi-piece part. The method also includes securing the assembled plurality of pieces of the multi-piece part together via a holder assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
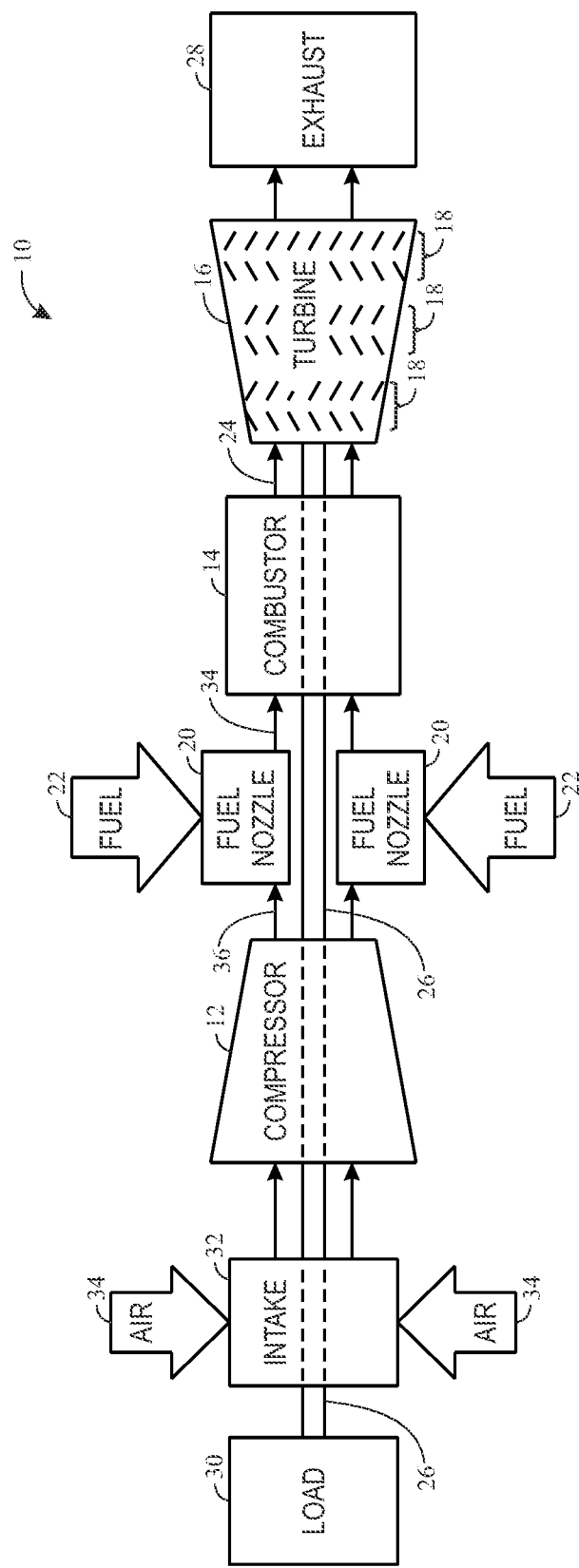
FIG. 1 is a block diagram of a gas turbine system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth above, there is currently a need for an improved approach on fabrication of complex parts, especially for complex parts with numerous physical and mechanical target properties. Conventionally, these parts are manufactured using single (e.g., all-at-once) fabrication method. For example, certain turbine parts are presently manufactured using a casting process, in which a single material, which is usually a metal or alloy, is introduced into a mold in a molten state and subsequently solidifies to take the shape of the mold. However, such monolithic fabrication techniques can introduce various limitations with respect to material selection, manufacturing process freedom, and/or the ability to implement fine features.

With this in mind, present embodiments are directed to a multi-piece hybrid fabrication of a part (e.g., a turbomachine part) via different processes (e.g., casting, molding, and additive manufacturing, etc.) and/or using multiple materials (e.g., ceramics, metals, alloys, composites, etc.). For example, as discussed in greater detail below, a multi-piece stage one nozzle segment, including a central vane piece (e.g., an airfoil) and two endwall pieces (e.g., outer and inner band segments), may be constructed by first fabricating and then assembling the individual pieces of the part. Accordingly, each piece of the stage one nozzle segment may be manufactured separately using different manufacturing methods and/or using different materials that are better suited for the respective pieces. For example, the endwalls may be fabricated via casting, while the vane may be fabricated via an additive manufacturing process (e.g., direct metal melting, direct metal sintering, binder jetting, etc.) that is more suitable for fabricating fine features, such as small cooling channels within the wall of the airfoil. The individual pieces (e.g., the vane and the endwalls) are then assembled together to form the part (e.g., the stage one nozzle segment). In addition, because the part is assembled via multiple pieces, each piece may be post processed separately (e.g., via heat treatments, surface treatments, surface coatings, etc.), machined separately (e.g., to make cooling holes among other features), inspected separately, and/or repaired or replaced separately. As such, present embodiments enable greater freedom (e.g., few restrictions) on the fabrication process to enable advanced designs via different processes and/or using multiple materials.

FIG. 1 is a block diagram of an embodiment of a gas turbine system 10, which may include features (e.g., cooling features such as cooling channels, cooling holes, impingement sleeves, flow guides, etc.) to improve cooling within certain portions of the system 10. As appreciated, the systems and methods described herein may be used in any turbine system, such as gas turbine systems and steam turbine systems, and is not intended to be limited to any particular machine or system. As shown, the system 10 includes a compressor 12, a turbine combustor 14, and a turbine 16, wherein the turbine 16 may include one or more separate stages 18. The system 10 may include one or more combustors 14 that include one or more fuel nozzles 20 configured to receive a liquid fuel and/or gas fuel 22, such as natural gas or syngas.

The turbine combustors 14 ignite and combust a fuel-air mixture, and then pass hot pressurized combustion gases 24 (e.g., exhaust) into the turbine 16. Turbine blades are coupled to a shaft 26, which is also coupled to several other components throughout the gas turbine system 10. As the combustion gases 24 pass through the turbine blades in the turbine 16, the turbine 16 is driven into rotation, which causes the shaft 26 to rotate. Eventually, the combustion gases 24 exit the gas turbine system 10 via an exhaust outlet 28. Further, the shaft 26 may be coupled to a load 30, which is powered via rotation of the shaft 26. For example, the load 30 may be any suitable devices that may generate power via the rotational output of the gas turbine system 10, such as an electrical generator, a propeller of an airplane, and so forth.

Compressor blades may be included as components of the compressor 12. The blades within the compressor 12 are coupled to the shaft 26, and will rotate as the shaft 26 is driven to rotate by the turbine 16, as described above. An intake 32 feeds air 34 into the compressor 12, and the rotation of the blades within the compressor 12 compresses the air 34 to generate pressurized air 36. The pressurized air 36 is then fed into the fuel nozzles 20 of the turbine combustors 14. The fuel nozzles 20 mix the pressurized air 36 and fuel 22 to produce a suitable mixture ratio for combustion.

Figure 2:
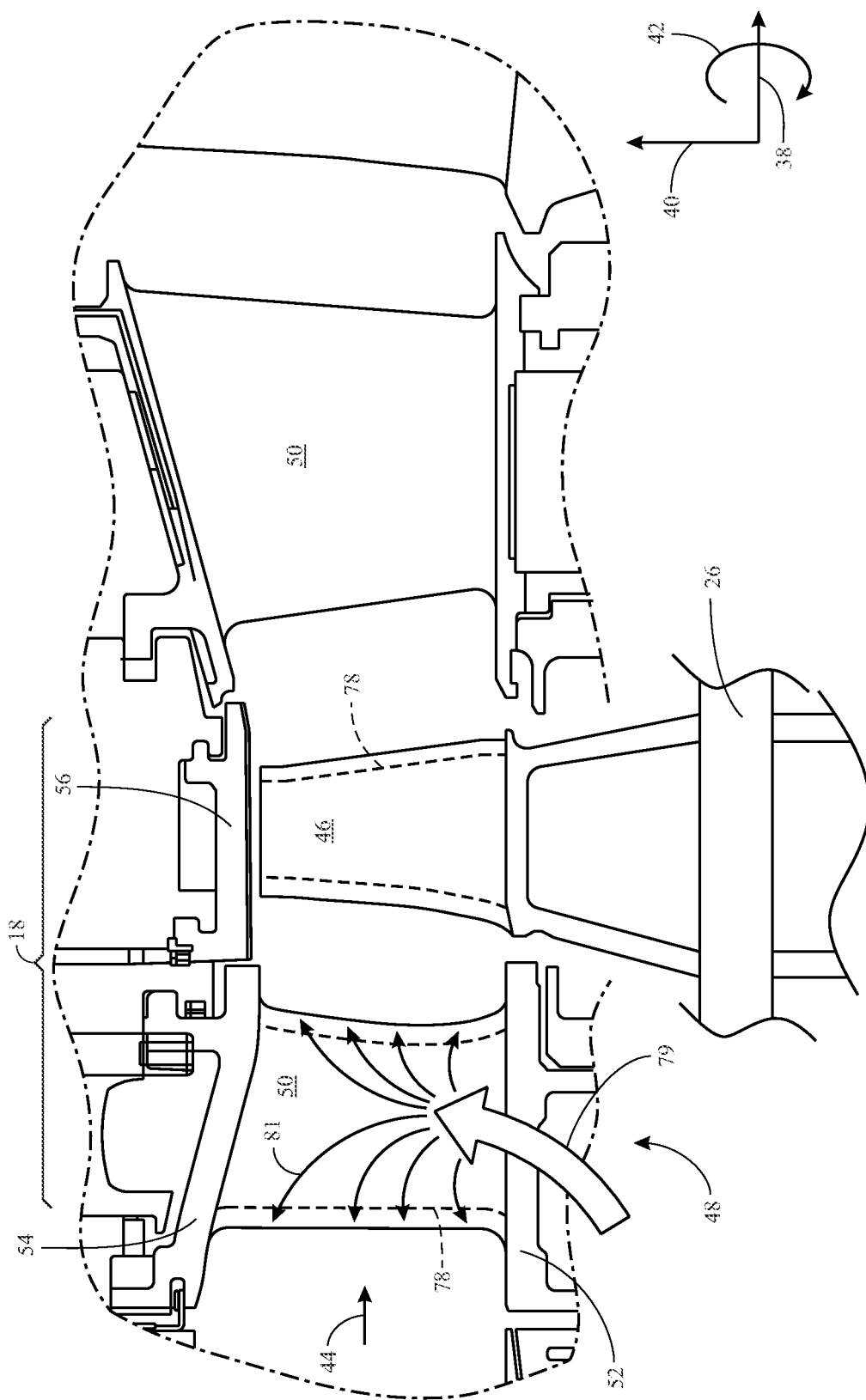
FIG. 2 is a partial side cross-sectional view of a portion of the gas turbine system of FIG. 1, in accordance with embodiments of the present disclosure.

FIG. 2 is a partial cross-sectional side view of an embodiment of the gas turbine system 10. As shown, the gas turbine system 10 may be described with reference to a longitudinal axis or direction 38, a radial axis or direction 40, and a circumferential axis or direction 42. The hot combustion gases 24 may flow from the combustors 14 (FIG. 1) into the turbine 16 in a direction generally along the longitudinal axis 38, illustrated by an arrow 44 in FIG. 2. Each of the stages 18 of the turbine 16 includes a set of blades 46 coupled to a rotor wheel that may be rotatably attached to the shaft 26. The turbine 16 includes turbine nozzle segments 48 within each of the stages 18, and the turbine nozzle segments 48 direct the hot combustion gases 24 towards the set of blades 46 of the respective stage 18. The turbine nozzle segments 48 described herein may be employed in a first stage, second stage, third stage, or combinations thereof, wherein "first" refers to the stage immediately downstream of the combustor 14. As may be appreciated, the term "downstream" generally refers to the direction of the combustion gases 24 through the turbine 16 along the longitudinal axis 38, as shown by the arrow 44. Likewise, the term "upstream" generally refers to the opposite direction (e.g., towards the compressor 12) along the longitudinal axis 38.

Each nozzle segment 48 may include circumferentially spaced vanes 50 (e.g., each defining an airfoil) that extend in the radial direction 40 between band segments 52 and 54 (e.g., inner and outer band segments). The adjacent band segments 54 (e.g., outer band segments) may be coupled together to form an outer annular ring extending around an inner annular ring of the adjacent band segments 52 (e.g., inner band segments). The vanes 50 may extend between the two annular rings formed by the band segments 52 and 54 (e.g., inner and outer band segments). The gas turbine system 10 may also include shroud segments 56, which may be disposed downstream of the band segments 54 (e.g., outer band segments) to direct hot combustion gases 24 flowing past the vanes 50 to the blades 46. Structures or components disposed along the flow path of a hot gas (e.g., the combustion gases 24) may be referred to as heated structures or components. In one example, the heated structure may be the blades 46 and other parts (e.g., vanes 50) of the turbine nozzle segment 48. In some embodiments, to cool the heated structures (e.g., vanes 50), cooling features, such as impingement sleeves, cooling channels, cooling holes, etc. may be disposed within the heated structures, as indicated by the dashed line 78. For example, cooling air as indicated by an arrow 79 may be routed from the compressor 12 or elsewhere and directed through the cooling features as indicated by arrows 81.

Present embodiments are directed to the multi-piece hybrid fabrication of a part via different processes (e.g., casting, molding, and additive manufacturing, among others) and/or using multiple materials (e.g., ceramics, metals, alloys, composites, etc.). It may be appreciated that the disclosed multi-piece hybrid fabrication process may be used to fabricate any suitable parts or segments of the gas turbine system 10. By way of a non-limiting example, the multi-piece hybrid fabrication process may be used to fabricate a stage one nozzle segment, as mentioned above and discussed in greater detail below. The disclosed multi-piece hybrid fabrication process may also be used to fabricate any suitable multi-piece parts (e.g., parts used in automobile industry, aeronautical industry, medical industry, gas and mining industry, sporting goods, tools and equipment, etc.).

Figure 3:
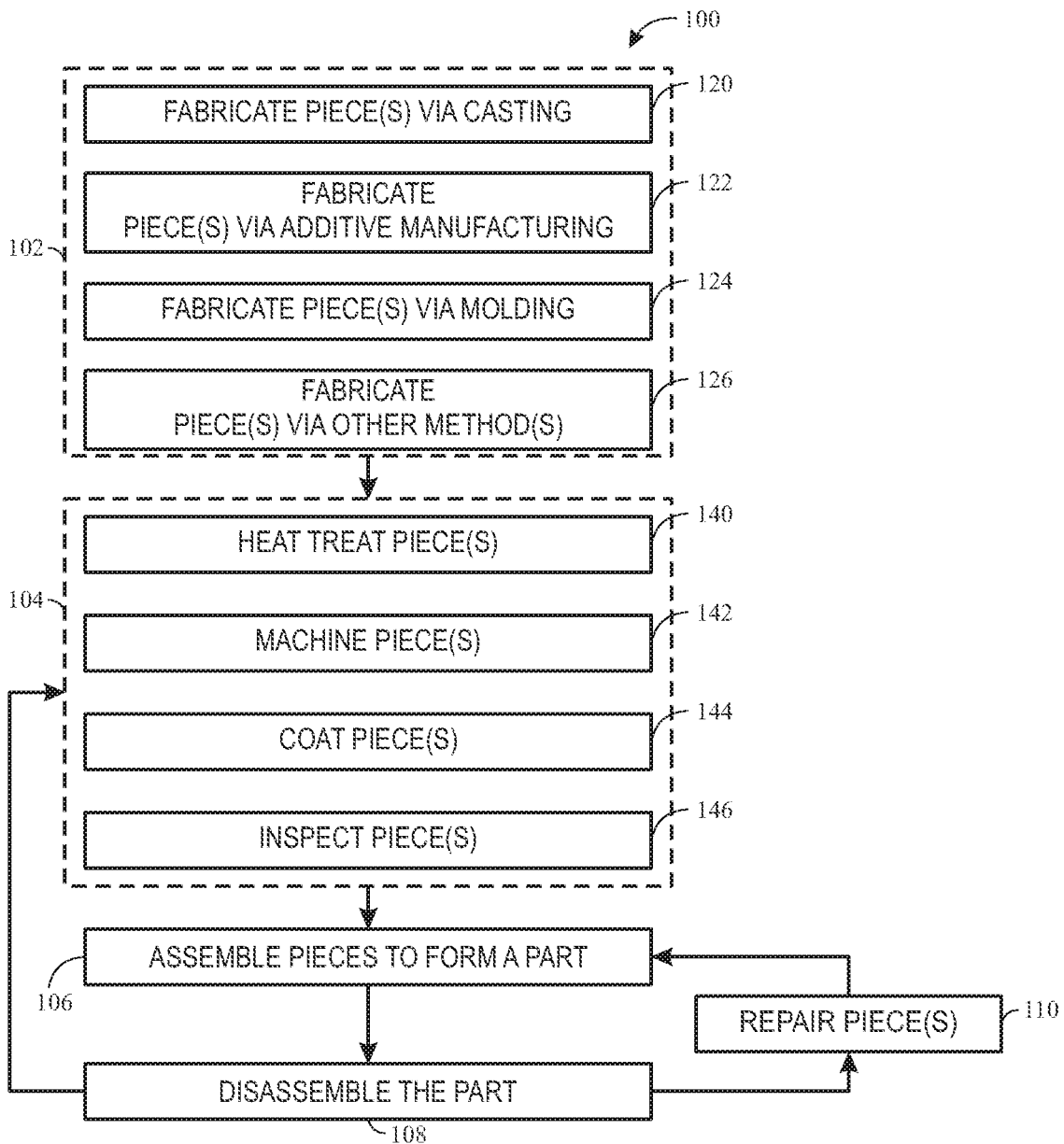
FIG. 3 is a flow chart illustrating a process for fabricating a multi-piece part of the gas turbine system of FIG. 1 via a multi-piece hybrid fabrication process, in accordance with embodiments of the present disclosure.

FIG. 3 is a flow chart illustrating an example of a multi-piece hybrid fabrication process 100 for fabricating a multi-piece part, in accordance with embodiments of the present technique. In the illustrated embodiment, the process 100 generally includes fabricating the pieces of the part (block 102) and post-processing the pieces of the part (block 104) before the pieces of the part are assembled (block 106). In certain embodiments, depending on issues encountered during manufacturing, the process 100 may include a disassembling (block 108) the pieces of the part, post-processing (block 104) or repairing (110) one or more pieces of the part, and then reassembling the piece of the part (block 106).

As illustrated, fabricating the pieces of the part (block 102) can involve multiple individual manufacturing or fabrication techniques. For example, in certain embodiments, the fabrication techniques may include fabricating pieces via casting (block 120), fabricating pieces via additive manufacturing (block 122), fabricating pieces via molding (block 124), and/or fabricating pieces via other suitable methods or processes (block 126). It may be appreciated that the part (e.g., the final, assembled product) generally includes multiple pieces or segments that are later assembled. Since different fabrication processes may be employed, the pieces may be made of different materials, resulting in a multi-piece part having combinations of materials (e.g., different alloys, metals and ceramics) not possible using conventional manufacturing techniques. The pieces may have different shapes or features varying in complexity from one another, and the present technique enables the use of finer resolution manufacturing techniques (e.g., additive manufacturing) for intricate pieces of a part, while using faster and/or lower cost manufacturing techniques for pieces of the part that have less complex geometries. As such, the various pieces of the part can be fabricated via suitable processes selected from the listed fabrication processes (e.g., processes 120, 122, 124, and 126) in accordance with the desired properties and the complexity of each piece.

The fabrication process represented by block 120 may include any suitable casting process, in which a piece of the part may be formed from materials suitable for casting (e.g., metal or metal alloys). For example, in certain embodiments, the fabrication process 120 may include a variety of casting processes, such as centrifugal casting, die casting, glass casting, investment casting, lost-foam casting, lost-wax casting, permanent mold casting, rapid casting, sand casting, slipcasting, among other casting processes. In certain embodiments, the metal or alloy may be introduced into the mold in molten form (e.g., as a liquid) or as a slurry that includes metallic particles. In the latter case, the metallic particles may be subsequently sintered to solidify the piece of the part within the mold, and the mold removed to yield the piece of the part. In certain embodiments, the casting process made be used to form a single-crystal part. In certain embodiments, the casted part may be directionally solidified or equiaxed.

The fabrication process represented by block 122 may include any suitable additive manufacturing processes, in which a piece of the part may be formed from materials suitable for additive manufacturing, such as metals, polymers, ceramic, or a combination thereof. The fabrication process 122 may include a variety of additive manufacturing processes, such as material jetting, binder jetting or binderjet process, material extrusion, powder bed fusion, sheet lamination, directed energy deposition, three-dimensional (3D) printing, direct metal laser melting (DMLM), direct metal laser sintering (DMLS), electron beam melting process, among other additive manufacturing processes.

It may be appreciated that the additive manufacturing processes represented by block 122 may be used to fabricate pieces of the part that include fine features (e.g., small and/or complex features, such as cooling channels, cooling holes, flow guides, etc.) that may be difficult or impossible to fabricate via other methods. In addition, because a wide variety of materials may be used in additive manufacturing, this enables greater freedom in material options for constructing the part. For example, in certain embodiments, DMLM and DMLS may be used to fabricate pieces of the part that are better suited to be made of metal or metal alloys. By further example, in certain embodiments, a binderjet process may be used to fabricate pieces that are better suited to be made of high-strength materials and/or dispersion strengthened materials, such as nickel and cobalt based superalloys. In certain embodiments, these materials may include ceramic and/or intermetallic materials, such as aluminides (e.g., nickel aluminide, titanium aluminide), silicides (e.g., titanium silicide, niobium silicide), metal matrix composites, ceramic matrix composites, ceramic matrix having reinforcement materials, such as silicon carbide, boron nitrides, fibers, nanotubes, among other high strength materials.

The fabrication process indicated by block 124 may include any suitable molding processes, in which a piece of the part may be formed from materials suitable for molding. For example, in certain embodiments, the fabrication process 124 may include a variety of molding processes, such as, blow molding, compression molding, extrusion molding, injection molding, thermoforming, among other molding processes. The fabrication process 126 may include other suitable processes (e.g., milling, stamping) not-listed above that may be used to fabricate pieces of the part. As such, each piece of the part may be separately fabricated via a suitable process considering factors including, but not limited to, desired material properties (e.g., mechanical properties, thermal properties, electrical properties, etc.), geometries, sizes, dimensions, shapes, costs, fabrication efficiency, fabrication speed, etc.

Upon completion of the fabrication of pieces in block 102, some or all of the pieces may be subjected to one or more post-processing steps 104 before the part is assembled. Alternatively, in certain embodiments, post-processing 104 may be omitted. In certain embodiments, post-processing 104 may include a heat treating pieces (block 140), machining pieces to modify pieces (block 142), applying one or more surface coatings to pieces (block 144), and/or to inspecting pieces (block 146). The freedom to post-process individual pieces offers many advantages. For example, different post-processing treatments and/or inspection may be efficiently applied to the targeted pieces without interventions or complications from the pieces that may not need such treatment(s) and/or inspection(s). Moreover, any identified defects may be addressed or the piece of the part may be swapped for a non-defective piece, without affecting the other pieces of the part or affecting overall part yield.

Upon completion of post-processing the pieces of the part in block 104, the pieces may be assembled (block 106) to form the part, as discussed below in greater detail with respect to FIG. 6. The assembly of block 106 may include one or more steps to removably couple (e.g., mechanically couple) and/or fixedly couple (e.g., weld or braze) together the pieces that form the part.

In some embodiments, the illustrated process 100 for fabricating the multi-piece part may also include steps for repairing or remanufacturing a part, for example, that is damaged or worn during use or installation, or that is damaged during manufacturing. For example, in certain embodiments, the process 100 includes disassembling the pieces of the part 108, repairing (block 110) the pieces, followed by the re-assembly of the part (block 106). For example, upon determination that a piece of the part is damaged or defective, the individual pieces of the part may be disassembled to enable easy access for repair or replacement of the particular piece. Upon completion of the repair or replacement, the pieces may be reassembled (e.g., the process 106) to form the part. In some embodiments, upon determining that pieces of the part are due for servicing, the pieces of the part may be disassembled (block 108), and one or more pieces may receive post-processing 104 (e.g., heat treating, machining, surface coating, and/or inspecting), in addition or alternative to the repairing described in block 110. Upon completion of the post-processing 104 and/or repair 110, the pieces may be reassembled (e.g., the process 106) to form the part.

Figure 4:
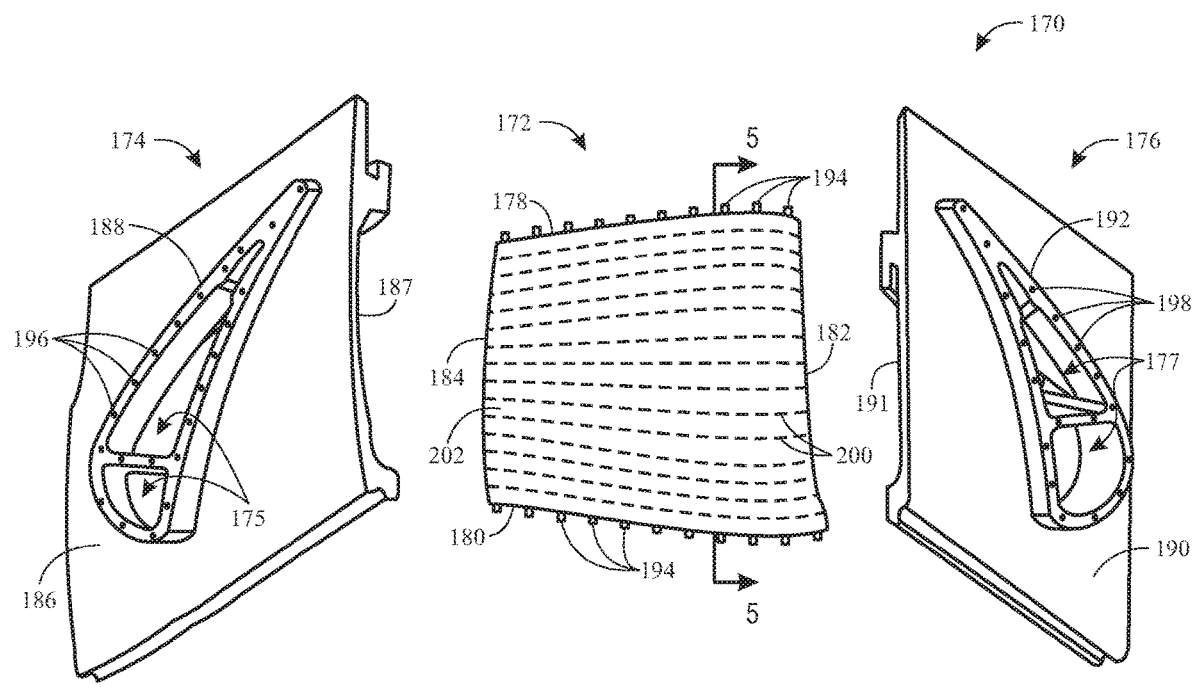
FIG. 4 is a perspective view of a multi-piece part, namely a stage one nozzle segment of the gas turbine system of FIG. 1, which may be fabricated via the multi-piece hybrid fabrication process of FIG. 3, in accordance with embodiments of the present disclosure.

By way of non-limiting example, FIG. 4 illustrates an example of a part 170 that may be fabricated using the multi-piece hybrid fabrication process (e.g., process 100) set forth above. FIG. 4 shows a perspective view of an example of a part 170 that includes a first piece 172, a second piece 174, and a third piece 176. In the illustrated embodiment, the part 170 is a nozzle segment 170 (e.g., first stage nozzle) that includes a vane 172, endwall 174 (e.g., corresponding to the outer band segment 54 in FIG. 2), and endwall 176 (e.g., corresponding to the inner band segment 52 in FIG. 2). The vane 172 generally has an airfoil shape extending between a first end 178 and a second end 180, and between a leading edge 182 and a trailing edge 184. The vane 172 is configured to be coupled between the endwalls 174 and 176 to form the nozzle segment 170, as will be discussed in FIG. 6.

The endwall 174 may include one or more openings 175 that extend between a first side 186 and a second side 187, as well as coupling features 188 (e.g., female connectors or openings) disposed on the first side 186. The endwall 176 may include one or more openings 177 that extend between a first side 190 and a second side 191, as well as coupling features 192 disposed on the first side 190. The coupling features 188 and 192 may be configured to interface with corresponding features (e.g., alignment features 194) disposed on the respective first end 178 and the second end 180 of the vane 172. For example, in certain embodiments, the coupling features 188 and 192 may include, but are not limited to, snap-fit features, friction-fit features, interference-fit features, form-fit features. For example, in certain embodiments, the coupling features 188 and 192 may each include a raised portion with respect to the first sides 186 and 190, respectively, and the raised portion may have a periphery or outline that matches the periphery or outline of the respective first end 178 and the respective second end 180, respectively. For example, in certain embodiments, these peripheries or outlines have the shape of an air foil, a tear drop, or an ear.

As mentioned, the illustrated vane 172 includes alignment features 194 (e.g., male connectors or pillars) on the first end 178 and on the second end 180 that correspond with and are inserted into the coupling features 186 and 190 during assembly. For example, as illustrated, the alignment features 194 may include one or more protrusions, and the coupling features 196 and 198 disposed on the coupling features 188 and 190 (e.g., disposed on the raised portions) may include one or more recesses configured to receive the protrusions (e.g., alignment features 194). As such, these alignment features 194 and the coupling features 196 and 198 may assist alignment and/or coupling between the vane 172 and the endwalls 174 and 176. It may be appreciated that, in other embodiments, the alignment features 194 and the coupling features 196 and 198 may include other suitable features.

Figure 5:
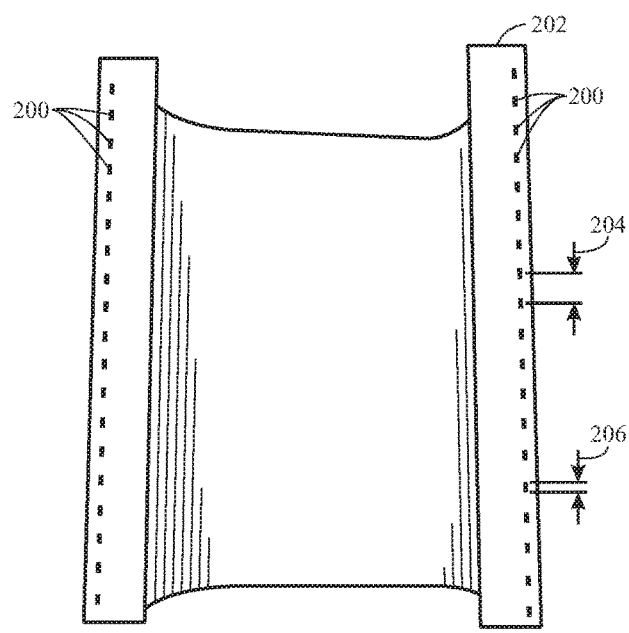
FIG. 5 is a cross-sectional view of a portion of the nozzle segment of FIG. 4 taken along a line 5-5, in accordance with embodiments of the present disclosure.

The vane 172 may include one or more cooling features, such as cooling channels 200. In the illustrated embodiment, the cooling channels 200 may extend within a wall or shell 202 of the vane 172 between the leading edge 182 the trailing edge 184. For example, FIG. 5 illustrates a cross-sectional view of the vane 172 of FIG. 4 taken along the line 5-5. As such, FIG. 5 illustrates that the cooling channels 200 may be disposed within the wall 202 at distance or spacing 204 from one another. The spacing 204 may be constant or may vary between each pair or adjacent cooling channels 200. The cooling channels 200 may each have a feature size 206 (e.g., width, diameter). In some embodiments, the feature size 206 may be between about 0.3 millimeter and about 3 millimeters. The feature size 206 may be constant or may vary for each cooling channels 200. In some embodiments, the vane 172 may include other cooling features and/or flow guiding features that may have fine dimensions and/or complex shapes.

It may be appreciated that at least due to the fine dimensions and/or the distribution of the cooling channels 200, it may be more suitable using certain processes to fabricate the vane 172. For example, it may be challenging to fabricate these cooling channels 200 via casting (block 120) and easier or more suitable to fabricate these via an additive manufacturing process (block 122). Further, because the nozzle segment 170 may be disposed along the hot gas path, it may be desirable for at least a portion of the nozzle segment 170 to be made of materials of high mechanical strength, such as ceramic and/or intermetallic materials (e.g., aluminides, silicides, metal matrix composites, ceramic matrix composites, ceramic matrix having reinforcement materials, etc.). As such, in certain embodiments, the vane 172 of the nozzle segment 170 may be fabricated via binderjet process to enable a variety of material choices. In some embodiments, the endwall 174, and the endwall 176 may be fabricated via casting (e.g., the process 120). In some embodiments, the endwalls 174 and 176 may be fabricated using a different material than that used to fabricate the vane 172. For example, in certain embodiments, the endwalls 174 and 176 may be made of metal or metal alloys, while the vane 172 may be made of ceramic and/or intermetallic materials. As such, the nozzle segment 170 may be fabricated via different processes and/or via different materials for different individual pieces.

Figure 6:
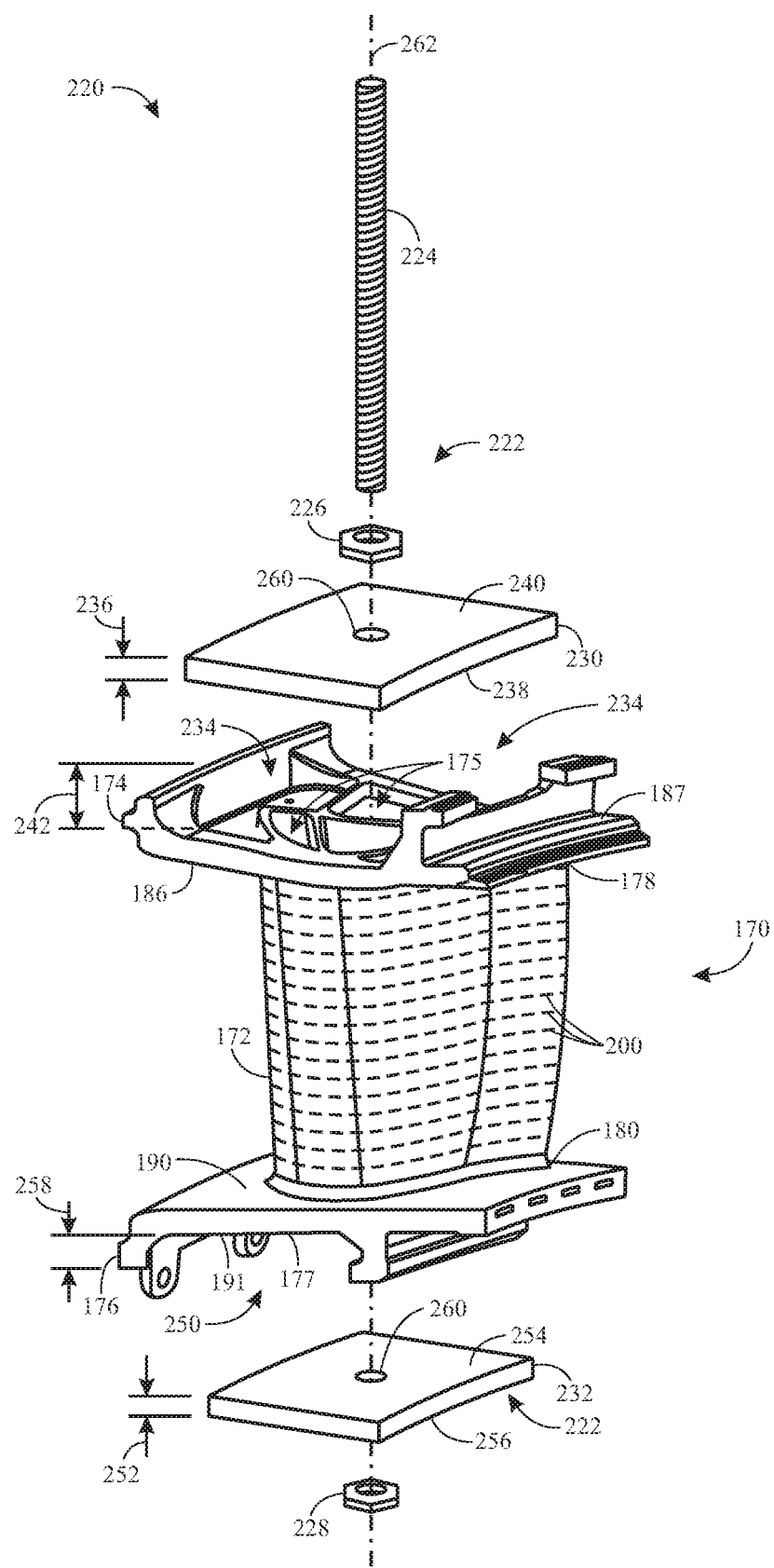
FIG. 6 is an exploded view of the nozzle segment of FIG. 4, in accordance with embodiments of the present disclosure.

FIG. 6 illustrates an exploded view of an example nozzle segment 220 that includes the vane 172 and the endwalls 174 and 176, as illustrated in FIG. 4, as well as a holder assembly 222 that to holds the assembled nozzle segment 170 together. In the illustrated embodiment, the holder assembly 222 includes a mechanical type coupling including a through-bolt 224, a first nut 226, a second nut 228, a first crossmember 230, and a second crossmember 232. The illustrated endwall 174 includes a space or cavity 234 on a second side 187, and the crossmember 230 is sized to be received in the space 234 (e.g., via male-female fit, form fit, etc.). For example, the crossmember 230 may have a plate-like shape with a thickness 236, a first side 238, and a second side 240. In some embodiments, the thickness 236 may be smaller than a depth 242 of the space 234, and the shape or dimensions of the crossmember 230 are such that the crossmember 230 may fit into the space 234 and completely cover the one or more openings 175 of the endwall 174. In some embodiments, the first side 238 may include features that may form fit or form a male-female coupling with features on the second side 187 of the endwall 174.

Likewise, the endwall 176 may include a space or cavity 250 on the second side 191, and the crossmember 232 may be configured to be received in the space 250 (e.g., via male-female fit, form fit, etc.). For example, the crossmember 232 may have a thickness 252, a first side 254, and a second side 256. In some embodiments, the thickness 252 may be smaller than a depth 258 of the space 250, and the shape or dimensions of the crossmember 232 are such that the crossmember 232 may fit into the space 250 and completely cover the one or more openings 177 of the endwall 176. In some embodiments, the first side 254 may include features that may form fit or form a male-female fit with features on the second coupling side 191 of the band segment 176.

Further, the crossmember 230 and the crossmember 232 each has an opening or a hole 260 that extends between the respective first and second sides. When the vane 174 and the endwalls 174 and 176 are coupled to one another, the holes 260 are aligned with at least one of the one or more openings 175 and 177, such that the through-bolt 224 may extend along an axis 262 (e.g., radial axis 262) through a retention feature 226 (e.g., nut 226), through the hole 260 on the crossmember 230, through the one or more openings 175 and 177 in the vane 172, through the hole 260 on the crossmember 232, and through another retention feature (e.g., nut 228). The through-bolt 224 and the retention features 226 and 228 may be tightened to secure the coupling between the vane 172 and the endwalls 174 and 176. In some embodiments, the holder assembly 222 may include any number of through-bolts and any number of retention features. In some embodiments, the holder assembly 222 may include any number of crossmembers. In some embodiments, the holder assembly 222 may include any other mechanical types of coupling using nuts and bolts (e.g., flange coupling, groove coupling, etc.).

In some embodiments, joints between one or more elements of the to-be-assembled nozzle segment 220 may be brazed, for example, during post-assembly processing of the multi-piece part. For example, a joint formed between the crossmember 230 and the endwall 174 (e.g., along the circumference of the first side 238) and/or a joint formed between the crossmember 232 and the endwall 176 (e.g., along the circumference of the first side 254) may be brazed to substantially reduce or eliminate gas leakage (e.g., into the one or more openings 175 and 177). By further example, joints formed between the tightened through-bolt 224 and nuts 226 and 228 may be brazed to substantially reduce or eliminate gas leakage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    fabricating a plurality of pieces of a multi-piece part via a plurality of different types of fabrication processes, wherein at least one piece of the plurality of pieces is fabricated via an additive manufacturing process;
    post-processing the at least one piece individually and separately from a remainder of the plurality of pieces by heat treating, surface coating, and/or machining the at least one piece;
    after post-processing the at least one piece, coupling the plurality of pieces together to assemble the multi-piece part; and
    securing the plurality of pieces of the multi-piece part to one another via a holder assembly.

2. The method of claim 1, wherein the fabricating of the plurality of pieces comprises fabricating a first alignment feature on a first end face of the at least one piece and fabricating a second alignment feature on a second end face of an additional piece of the plurality of pieces, wherein the first alignment feature is configured to removably couple with the second alignment feature.

3. The method of claim 2, wherein the coupling of the plurality of pieces comprises engaging the first end face of the at least one piece with the second end face of the additional piece to enable the first alignment feature and the second alignment feature to receive and engage with one another.

4. The method of claim 1, wherein the at least one piece is additively manufactured via a binderjet process, a three-dimensional printing process, a direct metal laser melting process, or a direct metal laser sintering process.

5. The method of claim 1, comprising fixedly coupling the plurality of pieces via a welding process or a brazing process.

6. The method of claim 1, wherein the fabricating of the plurality of pieces comprises fabricating at least one additional piece of the plurality of pieces via a casting process.

7. The method of claim 1, comprising post-processing the plurality of pieces of the multi-piece part individually and separately by heat treating, surface coating, and/or machining the plurality of pieces.

8. The method of claim 1, wherein the fabricating of the plurality of pieces comprises:
    fabricating the at least one piece of the plurality of pieces from a metal matrix composite, a ceramic matrix composite, or an intermetallic material; and
    fabricating at least one additional piece of the plurality of pieces from a metal or a metal alloy.

9. The method of claim 1, wherein the fabricating of the at least one piece comprises forming channels within a wall of the at least one piece, wherein each of the channels has a width between 0.3 millimeter and 3 millimeters.

10. The method of claim 1, wherein the securing of the plurality of pieces of the multi-piece part to one another via the holder assembly comprises securing the plurality of pieces via a reversible, mechanical type coupling.

11. A method, comprising:
    fabricating a first piece of a multi-piece part via an additive manufacturing process, wherein the first piece includes a first end face;
    fabricating a second piece and a third piece of the multi-piece part via an additional manufacturing process, wherein the second piece includes a second end face;

fabricating a set of complementary alignment features comprising one or more pillars on the first end face and one or more recesses within the second end face; and coupling the first piece, the second piece, and the third piece to one another to form the multi-piece part, wherein the first piece is coupled to the second piece along an interface between the first end face and the second end face such that the complementary alignment features receive and engage with one another along the interface.

12. The method of claim 11, wherein the coupling of the first piece, the second piece, and the third piece comprising securing the first piece, the second piece, and the third piece to one another via a reversible, mechanical type coupling.

13. The method of claim 12, wherein the securing of the first piece, the second piece, and the third piece via the reversible, mechanical type coupling comprises:

positioning the first piece between the second piece and the third piece;

disposing a set of crossmembers adjacent the second piece and the third piece; and extending a bolt through the set of crossmembers, the first piece, the second piece, and the third piece.

14. The method of claim 11, wherein the third piece includes a third end face, wherein the fabricating of the set of complementary alignment features comprises forming one or more additional recesses within the third end face.

15. The method of claim 11, wherein the first piece is additively manufactured via a binderjet process, a three-dimensional printing process, a direct metal laser melting process, or a direct metal laser sintering process, and wherein the second piece and the third piece are fabricated via a casting process such that the second piece and the third piece are each a single-crystal part.

16. A method, comprising:

fabricating a plurality of pieces of a multi-piece part, wherein the fabricating of the plurality of pieces comprises:

fabricating a first piece of the multi-piece part from a metal matrix composite, a ceramic matrix composite, or an intermetallic material via an additive manufacturing process;

fabricating a second piece and a third piece of the multi-piece part from a metal or a metal alloy via an additional manufacturing process; forming a first plurality of complementary alignment features on the first piece and the second piece and forming a second plurality of complementary alignment features on the first piece and the third piece;

coupling the first piece and the second piece to mechanically engage the first plurality of complementary alignment features and coupling the first piece to the third piece to mechanically engage the second plurality of complementary alignment features; and securing the plurality of pieces to one another via a holder assembly to form a turbine component.

17. The method of claim 16, wherein the fabricating of the plurality of pieces comprises forming openings within the first piece, the second piece, and the third piece, wherein the openings are configured to align with one another to form a channel through the multi-piece part in an assembled configuration of the plurality of pieces.

18. The method of claim 17, wherein the securing of the plurality of pieces to one another via the holder assembly comprises extending a rod trough each of the openings in the assembled configuration of the plurality of pieces.

19. The method of claim 18, wherein the fabricating of the first piece comprises forming cooling channels within a wall of the first piece, wherein a spacing between individual cooling channels of the cooling channel varies along a dimension of the wall.

20. The method of claim 19, wherein the fabricating of the second piece and the third piece comprises fabricating the second piece and the third piece via a casting process.

* * * * *